Aug. 15, 1967     C. H. HEEREN     3,335,631

COUPLING PIN

Filed Nov. 12, 1965

Clyde H. Heeren,
Inventor.
Koenig, Senniger, Powers and Leavitt,
Attorneys.

United States Patent Office 3,335,631
Patented Aug. 15, 1967

3,335,631
COUPLING PIN
Clyde H. Heeren, Rte. 1, Walshville, Ill. 62091
Filed Nov. 12, 1965, Ser. No. 507,487
2 Claims. (Cl. 85—3)

This invention relates to coupling pins for use in hitches between tractors and trailers or the like, and with regard to certain more specific features, to such pins which are of the quick-removable and locking type.

Among the several objects of the invention may be noted the provision of a springless coupling pin of the class described, the locking elements of which operate positively to prevent accidental removal from a hitch; the provision of a pin of this class which may be easily adjusted for manual application to and removal from a hitch; and the provision of such a coupling pin of the class described which is foolproof and of low cost. Other objects and features will be in part apparent and in part pointed out hereinafter.

The invention accordingly comprises the article hereinafter described, the scope of the invention being indicated in the following claims.

In the accompanying drawings, in which one of various possible embodiments of the invention is illustrated, FIG. 1 is a front elevation of a hitch pin made according to the invention and shown in locked condition, the dotted lines illustrating a typical hitch in which the pin is located;

Corresponding reference characters indicate corresponding parts throughout the several views of the drawings.

Figure 1:
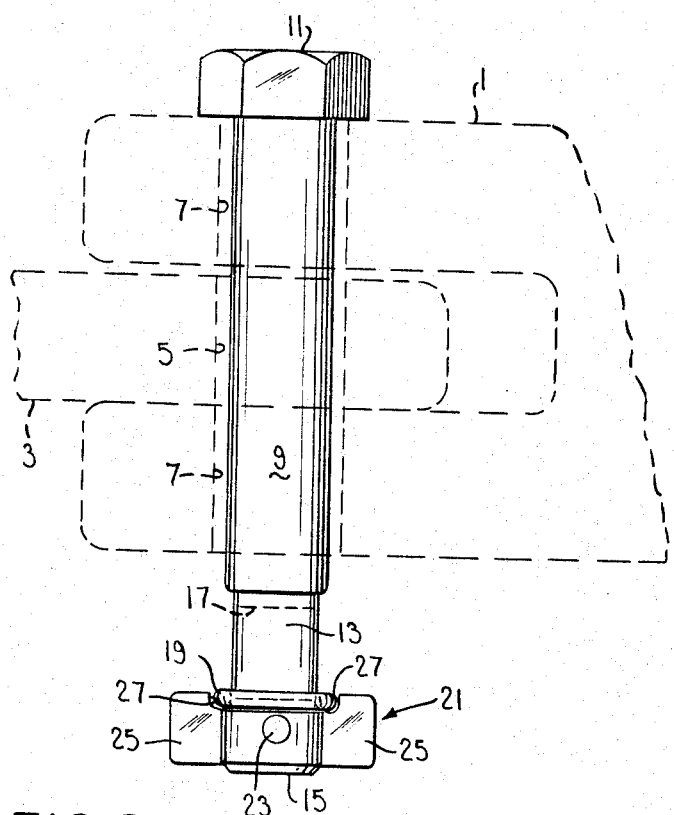

Typical use of the coupling pin of the invention is illustrated by the dotted lines in FIG. 1. Numeral 1 indicates a typical clevis extending from a tractor vehicle or the like with which a drawbar 3 of a typical trailer vehicle or the like is to be connected. To make a connection, a hole or eye such as 5 in the drawbar is brought into alignment with holes or eyes 7 in the clevis 1. A bolt is then inserted through the eyes 5 and 7 to form the hitch. It is desirable that any bolt used be easily insertable and that after insertion it be easily placed in a condition that it cannot escape from the parts 1 and 3.

Referring now more particularly to the solid-line illustrations of the drawings, numeral 9 indicates a cylindrical shank having a head 11 at its upper end. The diameter of the shank 9 at its lower end is reduced for some distance along its length as indicated at 13, below which is provided a second smaller head 15. The diameter of the head 15 is approximately equal to the diameter of the portion of the bolt above the reduced section 13. Parts 9 and 13 form a stem between the heads 11 and 15.

Figure 2:
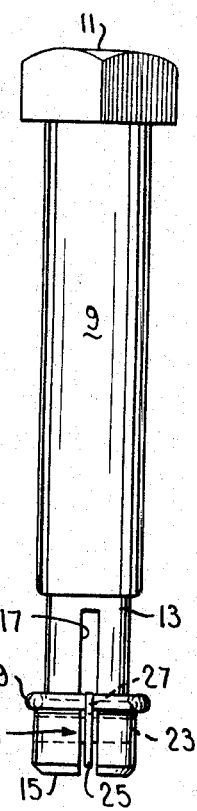
FIG. 2 is a right-side elevation of FIG. 1.

An axial slot 17 extends through the lower head 15 and a substantial portion of the reduced section 13. Slidable on the reduced section 13 is a toroidal ring 19, i.e., of circular cross section and circular in plan, which is slidable on the reduced section 13. At numeral 21 is shown a locking bar which by means of a crosspin 23 in the lower head 15 is pivoted in the slot 17. The bar 21 is in the form of a flat rectangular plate providing wings 25 on opposite sides of the pivot 23. The width of the plate 21 is less than the inside diameter of the ring 19. In each wing 25 is a semicircular notch 27. These notches are adapted when plate 21 is horizontal to receive the ring 19 in its lower position on the reduced section 13. This occurs when the hitch pin as a whole is located in the parts 1, 3 (FIGS. 1 and 2).

Figure 3:
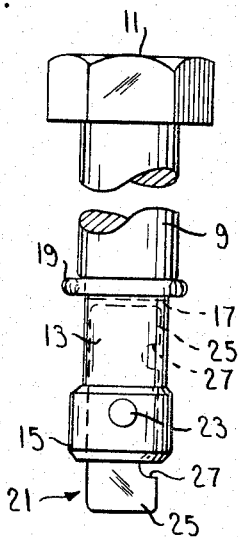
FIG. 3 is a fragmentary side elevation, showing the pin in an intermediate position of parts preparatory to insertion into a hitch.
Figure 4:
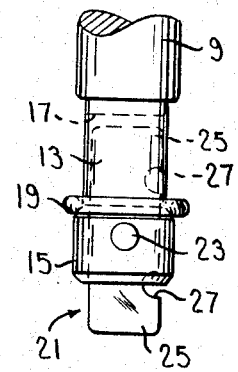
FIG. 4 is a fragmentary view similar to FIG. 3, showing another locked position of parts just prior to insertion.

To prepare the pin for insertion or withdrawal, the ring 19 is raised on the reduced section 13 as shown in FIG. 3. This permits the locking plate 21 to be rotated in slot 17 so that it has a longitudinal aspect with respect to the center line of the shank 9. Its width is such that the ring 19 may then be allowed to fall down by gravity as shown in FIG. 4, thus preparing the pin for insertion into or removal from parts 1 and 3 by locking the plate 21 in an axially directed position. It will be understood that the outside diameter of the ring 19 is smaller than the inside diameters of the holes or eyes 5 and 7.

Figure 5:
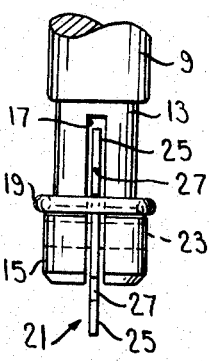
FIG. 5 is a right-side elevation of FIG. 4.

After the pin in its condition shown in FIGS. 4 and 5 has been inserted through the holes 5 and 7, the ring 19 may be temporarily lifted and the locking plate 21 brought into its cross position with the notches 29 up. The ring 19 is then dropped into position in the notches 29, thus locking the plate 21 in its transverse locking position to hold the pin captive in parts 1 and 3.

I am aware that locking coupler pins have heretofore been proposed in which rotary locking bars have been springingly detained in locking positions. These, however, were unsatisfactory inasmuch as knocks, vibrations and the like sometimes drove them from their positions of detention so that the pins might ascape and cause decoupling. This cannot occur with the pins made according to my invention. This is for the reason that if the plate 21 in the positions such as shown in FIGS. 1 and 2 should tend to be turned in either direction even under great force such as a blow, it cannot be moved. Regardless of how force is applied to the bar 21, one of the notches 29 will tend to be raised against the adjacent portion of the ring 19 while at the same time the other notch will descend. This cocks or tilts the ring 19 on the reduced portion 13 so that the ring cannot slide up axially on 13. The result is that the bar 21 is practically immovable from its transverse locking position (FIGS. 1 and 2), until manually released.

On the other hand, whenever it is desirable to remove the pin from the hitch, the ring 19 may readily be moved upward by grasping it between the operator's fingers to eliminate its tilt, whereupon it may be slid up easily on section 13. Then it becomes easy to turn the plate 21 into the axial position shown in FIG. 3. Then the ring is dropped to the position shown in FIGS. 4 and 5 and the pin may be readily removed with the bar 21 locked in its axial position (FIGS. 4 and 5). The pin is likewise prepared for insertion, as will be clear from the description above given.

It will be noted that when the locking plate 21 is in the axial position illustrated in FIGS. 3–5, the ring 19 is prevented from falling away from the pin by reason of the head 15.

When the pin is in the position shown in FIGS. 4 and 5, the fingers of the operator are not required at its lower end for insertion into the holes 5, 7. Thus the pin may be held at the upper head 11 for such insertion, keeping the hands away from the more or less dangerous coupling members 1, 3. When the pin is in position in FIG. 1 and it is required to raise the ring 19 in order to place the locking plate 21 into the position shown in FIG. 3, the ring may be raised without substantial danger of any injury from the then-coupled members 1 and 3.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A coupling pin comprising a shank having an upper enlarged head and a lower end, a ring freely slidable on a portion of said lower end when the shank is substantially vertical and the circular plane of the ring is substantially level, the ring being formed for tilt on the shank and locking thereto when the ring is tilted, said shank having an axial slot opening from said lower end toward said head, an elongated plate pivotally connected in said slot and movable from a retracted position longitudinal to the shank to a position crosswise of the shank with its end portions extending oppositely therefrom to support the ring under gravity, the lesser dimension of said plate being entirely confined within said shank when said plate is in the retracted position, said plate being formed with a pair of notches which are located on opposite sides of said shank when the plate is in the crosswise position to receive portions of the ring, said notches causing the ring to lockingly engage the shank when the ring is tilted relative to the shank by any substantial upward movement of one end of the plate when the plate is tilted by any blow on either of its ends, the opening through said ring accommodating and locking the plate in the retracted position.

2. A coupling pin according to claim 1, wherein the lower end portion of the shank on which the ring slides is reduced, and a slotted head enlarged relative to the reduced lower end portion is provided below said reduced lower end portion to hold the ring captive on the reduced portion and to brace the plate when extended.

References Cited
UNITED STATES PATENTS 2,840,398    6/1958    Chapellier _____ 85—3

FOREIGN PATENTS 91,256    7/1961    Denmark.

CARL W. TOMLIN, *Primary Examiner.*

R. S. BRITTS, *Assistant Examiner.*